Jan. 5, 1932. N. J. NAPOLI 1,839,331
COLLAR FASTENER
Filed June 9, 1931

Inventor

NICHOLAS J. NAPOLI.

By Clarence A. O'Brien
Attorney

Patented Jan. 5, 1932

1,839,331

UNITED STATES PATENT OFFICE

NICHOLAS J. NAPOLI, OF FORT LEE, NEW JERSEY

COLLAR FASTENER

Application filed June 9, 1931. Serial No. 543,193.

This invention relates to improvements in collar fasteners.

The primary object of the invention resides in a fastening device for attachment to the outer folds of a soft collar for holding them in a set position after the tie has been applied to impart a neat appearance thereto.

Another object of the invention is to provide a collar fastener which may be quickly and evenly applied to or removed from the ends of the outer folds of a soft collar. In the various types of collar fasteners now on the market, it is difficult to effect the attachment of the same without soiling or marking the collar due to the sliding of the fasteners to the desired position after being attached, while my invention permits free adjustment of the fastener to the desired position, after which the same may be firmly secured.

A further object of the invention is to provide a collar fastener which is simple of construction, inexpensive of manufacture, and ornamental and attractive in appearance.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1:
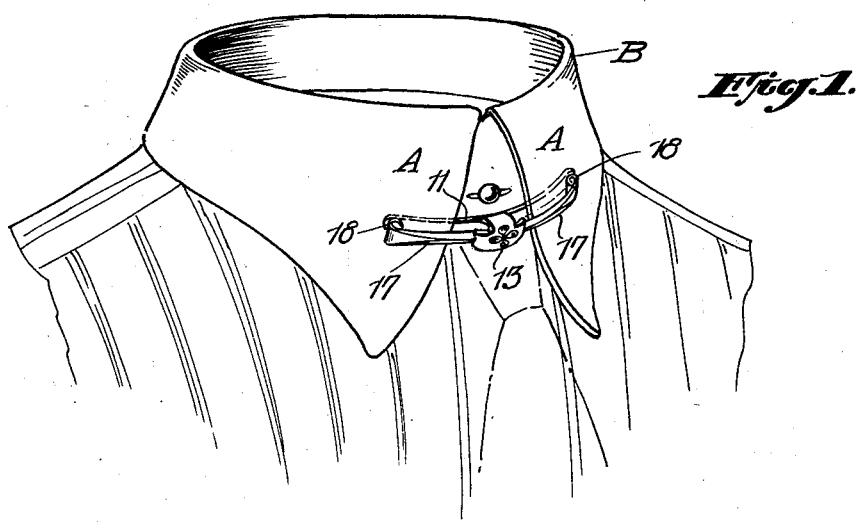
Figure 1, is a perspective view of my improved collar fastener in position upon a collar.

Referring to the drawings by reference characters, the numeral 10 designates my improved collar fastener in its entirety which comprises an elongated body or bar 11, the opposite ends of which are curved rearwardly as at 12. Formed integrally with the bar 11 and extending forwardly thereof is a plate 13 which is connected to the bar 11 by a bridge portion 14. The plate 13 is disposed in spaced relation with the front of the bar 11 and has its opposite ends bent inwardly and provided with V-shaped notches 15 for a purpose to be presently explained.

Figure 4:
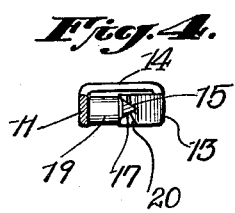
Figure 4, is a vertical transverse sectional view on the line 4—4 of Figure 3.
Figure 5:
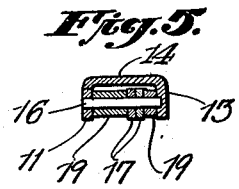
Figure 5, is a similar view on the line 5—5 of Figure 3.

The plate 13 is disposed approximately centrally between the ends of the bar 11 and supports one end of a pivot pin 16, the opposite end of the pin being supported by the bar 11. Pivotally mounted upon the pivot pin 16 are the inner ends of a pair of gripping arms 17, the outer ends of which are coiled inwardly to provide resilient gripping portions 18 which engage the front side of the bar 11 adjacent the rearwardly curved ends 12. Spacer members 19 are arranged between the pivoted ends of the arms and the plate 13 and bar 11 so as to properly dispose the gripping arms 17 with respect to the coacting bar 11. The major portion of the gripping arms 17 are substantially triangular in cross section as shown in Figure 4 of the drawings so that one of the edges of the arms will seat in the V-shaped notches 15 hereinbefore mentioned when the said arms are in gripping position. The ends of the plate 13 adjacent the notches 15 are provided with bevelled surfaces 20 for guiding the arms 17 into their respective notches when the arms are swung to operative gripping position.

Figure 2:
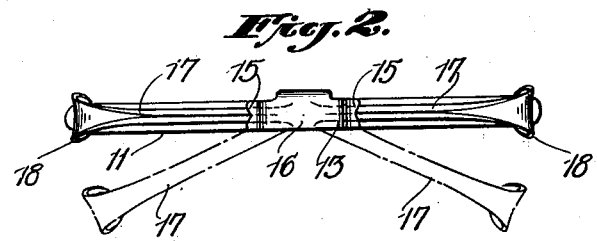
Figure 2, is a front elevational view of the collar fastener per se with the arms shown in gripping position in full line and in released position in dotted line.
Figure 3:
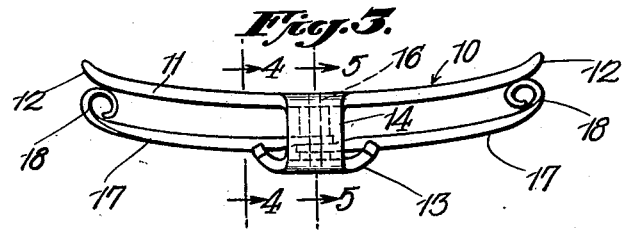
Figure 3, is a top plan view of the fastener.

Assume that it is desired to apply the collar fastener 10 to the outer fold A—A of a soft collar B. The arms 17—17 are released from their engagement with the walls of the notches 15 and swung to a position such as shown in dotted line in Figure 2 of the drawings. The rear bar 11 is inserted behind the folds A—A and the fastener adjusted to the desired position, after which the arms 17—17 are successively swung to a position substantially parallel with the bar 11 so that the folds A—A of the collar are gripped between the coiled end 18 of the arms and the adjacent curved end 12 of the bar 11. When in this gripping position, one of the corners of the triangular shaped portions of the arms snaps into the V-shaped notches 15 due to the fact that the arm 17 as well as the plate 13 is constructed of resilient material. When in gripping position, the coacting gripping portions serve to hold the folds of the collar in the desired position and if desired, the plate 13 may have the monogram of the owner inscribed thereon so as to add to the attractiveness of the device. In many of the collar fasteners now upon the market, the gripping elements are always disposed in gripping position which requires the spreading of the gripping elements or the forcing of the folds of the collar beneath the elements when applying the fastener into position. This results in the soiling of the folds of the collar and the possible wrinkling of the same whereas in the construction shown, the gripping action is not set up until after the fastener has been adjusted to the desired position.

Although I have specifically stated that the fastener is especially designed for holding the folds of a soft collar, nevertheless the principle of gripping may be embodied in fasteners for various other uses.

Having thus described the invention, what is claimed as new and what it is desired to secure by Letters Patent of the United States, is:

1. A fastening device comprising a body member, a pair of arms pivotally mounted on said body member for individual swinging movement transversely thereof, the free ends of said arms adapted to coact with said body member adjacent opposite ends thereof to grip parts to be held therebetween.

2. A fastening device comprising a body member, a pair of arms pivotally mounted on said body member for individual swinging movement transversely thereof, the free ends of said arms adapted to coact with said body member adjacent opposite ends thereof to grip parts to be held therebetween, and means for locking said arms in gripping position with respect to said body member.

3. A fastening device comprising an elongated bar, a pair of resilient arms pivotally connected to said bar approximately centrally thereof for individual swinging movement transversely of said bar, the free ends of said arms adapted to coact with the opposite ends of said bar to grip parts held therebetween, and releasable catch means for holding said arms in gripping engagement with said bar.

4. A fastening device of the class described comprising a bar, a member secured to said bar approximately centrally thereof and extending forwardly of said bar and overlying the same in spaced relation, a pair of gripping arms pivotally mounted between said member and said bar, and means on said member for securing said arms in position parallel to said bar when swung to such position to hold the outer ends of said arms in gripping position with respect to said bar.

In testimony whereof I affix my signature.

NICHOLAS J. NAPOLI.